(12) United States Patent
Kimoto et al.

(10) Patent No.: US 11,615,503 B2
(45) Date of Patent: Mar. 28, 2023

(54) INFORMATION PROCESSING APPARATUS, METHOD AND COMPUTER-READABLE MEDIUM

(71) Applicant: Sony Group Corporation, Tokyo (JP)

(72) Inventors: Masashi Kimoto, Tokyo (JP); Shigeatsu Yoshioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/475,755

(22) Filed: Sep. 15, 2021

(65) Prior Publication Data

US 2022/0005143 A1    Jan. 6, 2022

Related U.S. Application Data

(63) Continuation of application No. 16/741,241, filed on Jan. 13, 2020, now Pat. No. 11,164,277, which is a continuation of application No. 16/107,400, filed on Aug. 21, 2018, now Pat. No. 10,535,112, which is a continuation of application No. 15/603,027, filed on
(Continued)

(30) Foreign Application Priority Data

Nov. 30, 2009  (JP) .................................. 2009-272907
Aug. 26, 2010  (JP) .................................. 2010-189614

(51) Int. Cl.
| | |
|---|---|
| G06T 1/00 | (2006.01) |
| G06F 16/33 | (2019.01) |
| G06F 16/58 | (2019.01) |
| G06F 16/338 | (2019.01) |

(Continued)

(52) U.S. Cl.
CPC ............ *G06T 1/00* (2013.01); *G06F 16/2457* (2019.01); *G06F 16/24573* (2019.01); *G06F 16/33* (2019.01); *G06F 16/338* (2019.01); *G06F 16/58* (2019.01); *G06F 16/583* (2019.01)

(58) Field of Classification Search
None
See application file for complete search history.

(56) References Cited

U.S. PATENT DOCUMENTS

| | | | |
|---|---|---|---|
| 6,031,930 A | 2/2000 | Bacus et al. | |
| 6,101,265 A | 8/2000 | Bacus et al. | |

(Continued)

FOREIGN PATENT DOCUMENTS

| | | |
|---|---|---|
| JP | 2000-148895 | 5/2000 |
| JP | 2008-500643 | 1/2008 |
| JP | 2009-037250 | 2/2009 |

OTHER PUBLICATIONS

Saalfeld et al., "CATMAID: colloborative annotation toolkit for massive amounts of image data", Bioinformatics, 2009, vol. 25, No. 15, pp. 1984-1986.

(Continued)

*Primary Examiner* — Robert J Craddock
(74) *Attorney, Agent, or Firm* — K&L Gates LLP

(57) ABSTRACT

In one example embodiment, an information processing apparatus causes a display device to display a first image from images associated with an observation target object. The images include the first image and a second image which corresponds to an annotation mark. In this embodiment, the information processing apparatus also causes the display device to display the annotation mark corresponding to the second image. In this embodiment, the displayed annotation mark overlaps the first image.

20 Claims, 12 Drawing Sheets

Related U.S. Application Data

May 23, 2017, now Pat. No. 10,121,219, which is a continuation of application No. 12/899,726, filed on Oct. 7, 2010, now Pat. No. 9,684,940.

(51) Int. Cl.
*G06F 16/583* (2019.01)
*G06F 16/2457* (2019.01)

(56) References Cited

U.S. PATENT DOCUMENTS

| | | |
|---|---|---|
| 6,226,392 B1 | 5/2001 | Bacus et al. |
| 6,272,235 B1 | 8/2001 | Bacus et al. |
| 6,396,941 B1 | 5/2002 | Bacus et al. |
| 6,404,906 B2 | 6/2002 | Bacus et al. |
| 6,522,774 B1 | 2/2003 | Bacus et al. |
| 6,674,881 B2 | 1/2004 | Bacus et al. |
| 6,674,884 B2 | 1/2004 | Bacus et al. |
| 6,775,402 B2 | 8/2004 | Bacus et al. |
| 7,110,586 B2 | 9/2006 | Bacus et al. |
| 7,146,372 B2 | 12/2006 | Bacus et al. |
| 7,149,332 B2 | 12/2006 | Bacus et al. |
| 7,292,251 B1 | 11/2007 | Gu et al. |
| 7,463,761 B2 | 12/2008 | Eichhorn et al. |
| 7,542,596 B2 | 6/2009 | Bacus et al. |
| 7,689,024 B2 | 3/2010 | Eichhorn et al. |
| 7,738,688 B2 | 6/2010 | Eichhorn et al. |
| 7,856,131 B2 | 12/2010 | Bacus et al. |
| 7,860,292 B2 | 12/2010 | Eichhorn et al. |
| 2004/0167806 A1 | 8/2004 | Eichhorn et al. |
| 2005/0254696 A1 | 11/2005 | Bacus et al. |
| 2008/0166036 A1 | 7/2008 | Bloom et al. |

OTHER PUBLICATIONS

Chinese Office Action dated Nov. 15, 2014, for corresponding Chinese Appln. No. 2010105573410.

Bradley et al., A One-pass Extended Depth of Field Algorithm Based on the Over-complete Discrete Wavelet Transform, Image and Vision Computing '04 New Zealand Conference, Nov. 2004, http://espace.library.uq.edu.au/view/UQ:8934/APB_PCB_ICVNZ.pdf (5 pages).

Giusti et al., Artificial Defocus for Displaying Markers in Microscopy Z-Stacks, IEEE Transaction on Visualization and Computer Graphics, Dec. 2011, vol. 17, No. 12, pp. 1757-1764.

European Office Action dated Mar. 4, 2015, for corresponding European Appln. No. 10014913.7 (8 pages).

Stefan Bruckner, Meister Eduard Groller, VolumeShop: An Interactive System for Direct Volume Illustration, In Proceedings of IEEE Visualization 2005, pp. 671-678, Oct. 2005.

European Search Report for Application EP 10 01 4913 dated May 6, 2011.

ImageScope Gebrauchsanweisung XP-002622032, Copyright 2006-2009, Aperio Technologies, Inc., Artikelnummer/Ausgabe: MAN-0138, Revision A Datum: Feb. 26, 2009.

INFORMATION PROCESSING APPARATUS, METHOD AND COMPUTER-READABLE MEDIUM

CROSS REFERENCES TO RELATED APPLICATIONS

The present application is a continuation of U.S. application Ser. No. 16/741,241, filed on Jan. 13, 2020, which is a continuation of U.S. application Ser. No. 16/107,400, filed on Aug. 21, 2018, now U.S. Pat. No. 10,535,112, issued on Jan. 14, 2020, which is a continuation of U.S. application Ser. No. 15/603,027, filed on May 23, 2017, now U.S. Pat. No. 10,121,219, issued on Nov. 6, 2018, which is a continuation of Ser. No. 12/899,726, filed on Oct. 7, 2010, now U.S. Pat. No. 9,684,940, issued on Jun. 20, 2017, which claims priority to Japanese Patent Application No. JP 2009-272907, filed in the Japanese Patent Office on Nov. 30, 2009, and Japanese Patent Application No. JP 2010-189614, filed in the Japanese Patent Office on Aug. 26, 2010, the entire content of each of which is hereby incorporated by reference herein.

BACKGROUND

In the field of medicine, pathology, or the like, there has been proposed a system that digitizes an image of a cell, a tissue, an organ, or the like of a living body, that is obtained by an optical microscope, to examine the tissue or the like by a doctor or a pathologist or to diagnose a patient based on the digitized image.

For example, Japanese Patent Application Laid-open No. 2009-37250 (hereinafter, referred to as Patent Document 1) discloses a method in which an image optically obtained by a microscope is digitized by a video camera with a CCD (charge coupled device), a digital signal is input to a control computer system, and the image is visualized on a monitor. A pathologist performs examination while watching the image displayed on the monitor (see, for example, paragraphs [0027] and [0028] and FIG. 5 of Patent Document 1).

Further, Japanese Patent Application Laid-open No. 2000-148895 (hereinafter, referred to as Patent Document 2) discloses a system in which position information is set on an arbitrary portion in such an image, for example, on a portion which may have a disorder, and content information is set in relation with the position information. In this system, a mark as the position information is displayed on the image, a selecting operation with respect to the displayed mark by using an input apparatus such as a mouse is accepted, and a comment as the content information registered in relation with the position information is displayed (see, for example, paragraph [0027] and FIG. 5 of Patent Document 2). The function in which position information or content information is set in relation with an image, and an image visually compounded with the position information or the content information is displayed is referred to as an "annotation function."

Meanwhile, in recent years, there is proposed an apparatus capable of displaying image data of one observation target object, the image data being of a plurality of positions different in an optical axis direction of a microscope, such that the image data are continuously displayed in the order of the optical axis direction (see, for example, paragraph [0023] and FIG. 3 of Japanese Patent Application Laid-open No. 2008-500643) (hereinafter, referred to as Patent Document 3). Herein, a set of image data of one observation target object, the image data being of a plurality of positions different in an optical axis direction of a microscope, is referred to as "Z-stack". According to such an apparatus, by continuously displaying, in an optical axis direction, image data of a plurality of positions different in the optical axis direction, a user can get a feeling of observing images while changing focuses of a microscope.

In a case where an image on which position information with regard to an annotation is set and an image on which position information is not set are mixed in a Z-stack, an image including a mark, which is obtained by visually compounding the position information of the annotation, and an image including no mark are continuously displayed in a mixed manner on a display screen. As a result, there is a fear that an observer may miss the mark and therefore may miss a disorder. For example, in the continuing display, owing to speed of changing images by an observer, the observer may miss a mark included in an image locating at the middle of the images.

In view of the above-mentioned circumstances, it is desirable to provide an information processing apparatus, a method and computer-readable medium for avoiding a risk of missing an annotation by an observer.

SUMMARY

The present disclosure relates to an information processing apparatus, a method, and a computer-readable medium for controlling display of image data obtained by a microscope in a field of medicine, pathology, biology, materials science, or the like.

In one example embodiment, an information processing apparatus includes a processor and a memory device operatively coupled to the processor, the memory device storing instructions that cause the processor, in cooperation with the memory device, to cause a display device to display: (a) a first image from images associated with an observation target object (e.g., a section of biological tissue), the images including the first image and a second image; and (b) a first annotation mark corresponding to the second image, the first annotation mark overlapping the first image.

In an example embodiment, the images are obtained by a microscope. In an example embodiment, the first image and the second image have a first resolution. In an example embodiment, the instructions cause the processor to enable a user to change the first resolution of the first image and the second image to a second, different resolution.

In an example embodiment, the images correspond to a plurality of different positions in an optical axis direction. In an example embodiment, the plurality of different positions in the optical axis direction are determined based on focusing positions.

In an example embodiment, the first annotation mark includes a predetermined shaped frame.

In an example embodiment, the instructions cause the processor to operate with the display device to display an annotation comment overlaying the displayed first image, the annotation comment being different from the displayed first annotation mark.

In an example embodiment, an input device is operatively coupled to the processor, and the instructions cause the processor to operate with the input device to enable a user to input annotation information.

In an example embodiment, the first annotation mark corresponds to a position on the second image, and the instructions cause the processor to cause a display device to display the first annotation mark at a position on the first image which corresponds to the position of the second image.

In an example embodiment, the instructions cause the processor to display a second annotation mark corresponding to the first image.

In an example embodiment, the first image corresponds to a first layer which corresponds to a first position in an optical axis direction, and the second image corresponds to a second layer which corresponds to a second position in the optical axis direction.

In an example embodiment, the first annotation mark and the second annotation mark have at least one different color, brightness, chroma, alpha blend values, widths of lines, and styles of lines, and the instructions cause the processor to change at least one of the color, the chroma, the alpha blend values, the widths of lines, and the styles of lines based on said layers which correspond to said positions in the optical axis direction.

In an example embodiment, the instructions cause the processor to enable a user to select the first annotation mark. In response to the first annotation mark being selected, the instructions cause the processor to cause a display device to display the second image, wherein the first annotation mark overlaps the displayed second image.

In an example embodiment, the instructions cause the processor to enable a user to select one of the first annotation mark and the second annotation mark. In response to the first annotation mark being selected, the instructions cause the processor to cancel the display of the second annotation mark. In response to the second annotation mark being selected, the instructions cause the processor to cancel the display of the first annotation mark.

In an example embodiment, the instructions cause the processor to, in response to the first annotation mark being selected, arrange and display the first annotation mark on a center portion of the displayed second image.

In an example embodiment, the instructions cause the processor to determine whether a user has requested a change from displaying the first image to displaying the second image. In response to the change being requested, the instructions cause the processor to determine whether a mode is set. In response to the mode being set, the instructions cause the processor to cause a display device to display the second image, and the first annotation mark overlapping the second image.

In an example embodiment, the instructions cause the processor to cause a display device to, in response to the mode being set, display a third annotation mark overlapping the second image, the third annotation mark corresponding to a third image.

In an example embodiment, the instructions cause the processor to cause the display device to, in response to the mode not being set, display the second image, and the first annotation mark overlapping the second image.

In an example embodiment, the instructions cause the processor to, for each displayed image associated with the observation target object, enable a user to register annotation information in a control table.

In an example embodiment, a method includes of operating an information processing apparatus including instructions includes: (a) causing a processor to execute the instructions to cause a display device to display a first image from images associated with an observation target object, the images including the first image and a second image; and (b) causing the processor to execute the instructions to cause the display device to display an annotation mark corresponding to the second image, the annotation mark overlapping the first image.

In an example embodiment, a computer-readable medium stores instructions structured to cause an information processing apparatus to: (a) cause a display device to display a first image from a plurality of different images associated with an observation target object, the plurality of images including the first image and a second image; and (b) cause the display device to display an annotation mark corresponding to the second image, the annotation mark overlapping the first image.

In an example embodiment, an information processing apparatus includes a processor, and a memory device operatively coupled to the processor, the memory device storing instructions that cause the processor, in cooperation with the memory device, to cause a display device to display: (a) a first image from a plurality of different images associated with an observation target object, the plurality of different images being obtained at a plurality of different focuses, the plurality of different focuses including a first focus and a second focus, the first image being obtained at the first focus, the second focus being different from the first focus; and (b) an annotation mark corresponding to the second focus, the annotation mark overlapping the first image.

In an example embodiment, a method of operating an information processing apparatus including instructions includes: (a) causing a processor to execute the instructions to cause a display device to display a first image from a plurality of different images associated with an observation target object, the plurality of different images being obtained at a plurality of different focuses, the plurality of different focuses including a first focus and a second focus, the first image being obtained at the first focus, the second focus being different from the first focus; and (b) causing the processor to execute the instructions to cause the display device to display an annotation mark corresponding to the second focus, the annotation mark overlapping the first image.

In an example embodiment, a computer-readable medium stores instructions structured to cause an information processing apparatus to: (a) cause a display device to display a first image from a plurality of different images associated with an observation target object, the plurality of different images being obtained at a plurality of different focuses, the plurality of different focuses including a first focus and a second focus, the first image being obtained at the first focus, the second focus being different from the first focus; and (b) cause the display device to display an annotation mark corresponding to the second focus, the annotation mark overlapping the first image.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, example embodiments will be described with reference to the drawings.

[Structure of an Example Information Processing Apparatus]

Figure 1:
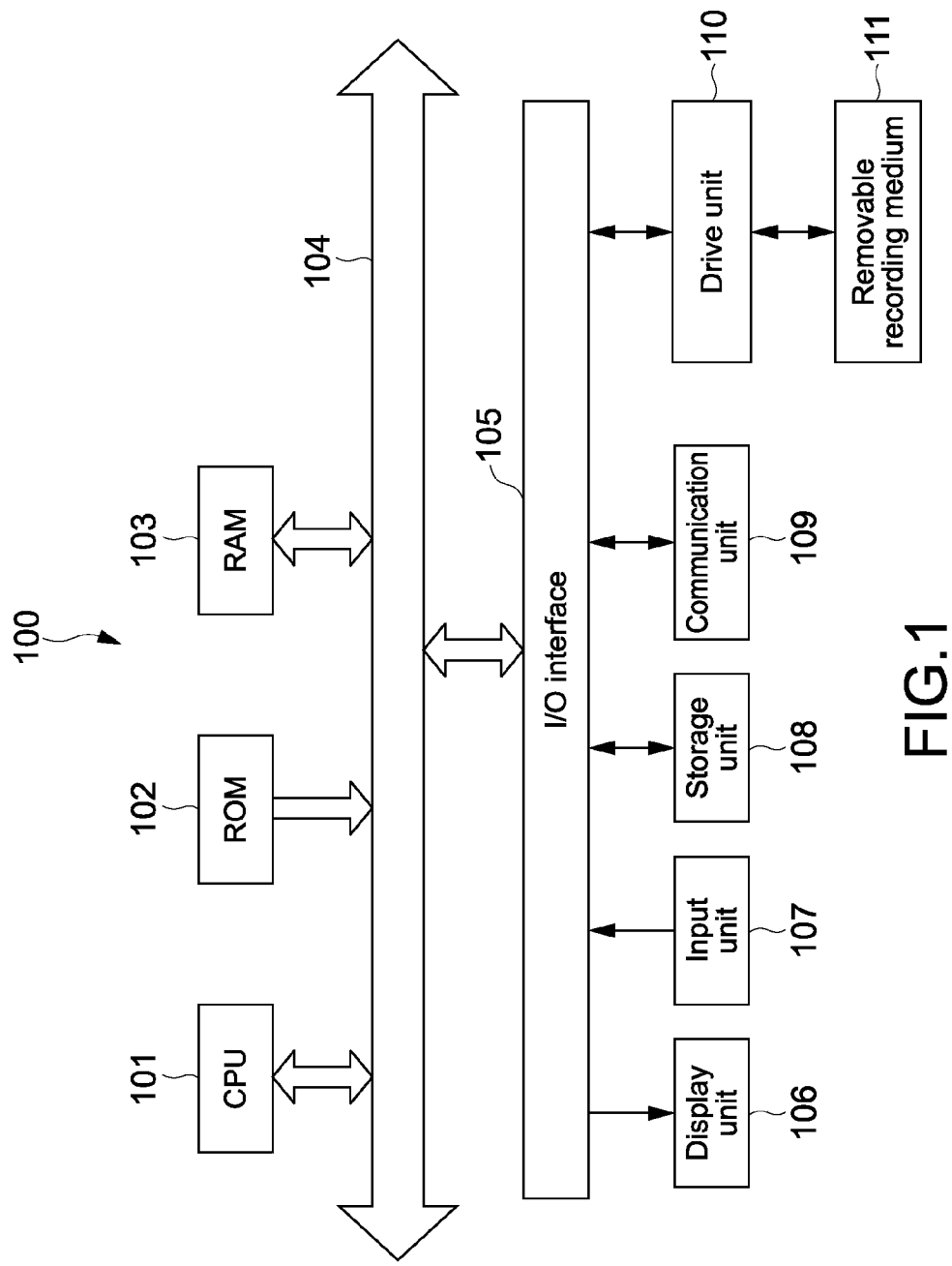
FIG. 1 is a block diagram showing an example structure of an information processing system including at least an information processing apparatus according to an embodiment of the present disclosure.

FIG. 1 is a block diagram showing an example structure of an information processing system including at least an information processing apparatus according to an embodiment of the present disclosure. As the information processing apparatus, a PC (personal computer) 100 is used, for example.

The PC 100 includes a CPU (central processing unit) 101, a ROM (read only memory) 102, a RAM (random access memory) 103, an input and output interface (hereinafter, abbreviated as I/O interface) 105, and a bus 104 that connects those components with one another.

To the I/O interface 105, a display unit 106, an input unit 107, a storage unit 108, a communication unit 109, a drive unit 110, and the like are connected.

The display unit 106 is a display device that uses liquid crystal, EL (electro-luminescence), a CRT (cathode ray tube), or the like.

The input unit 107 is, for example, a pointing device, a keyboard, a touch panel, or another operation apparatus. In the case where the input unit 107 includes a touch panel, the touch panel may be integrated with the display unit 106. Alternatively, the input unit 107 is an input apparatus connected to the PC and including a dial-type knob.

The storage unit 108 is a non-volatile memory such as an HDD (hard disk drive), a flash memory, and another solid-state memory.

The drive unit 110 is a device capable of driving a removable recording medium 111 such as an optical recording medium, a floppy (registered trademark) disk, a magnetic recording tape, and a flash memory. In contrast, the storage unit 108 is often used as a device that is previously included in the PC 100 and mainly drives a recording medium that is not removable.

The communication unit 109 is a modem, a router, or another communication apparatus that is connectable to a LAN (local area network), a WAN (wide area network), or the like and is used for communicating with another device. The communication unit 109 may perform either one of a wired communication or a wireless communication. The communication unit 109 is used separately from the PC 100 in many cases.

Figure 2:
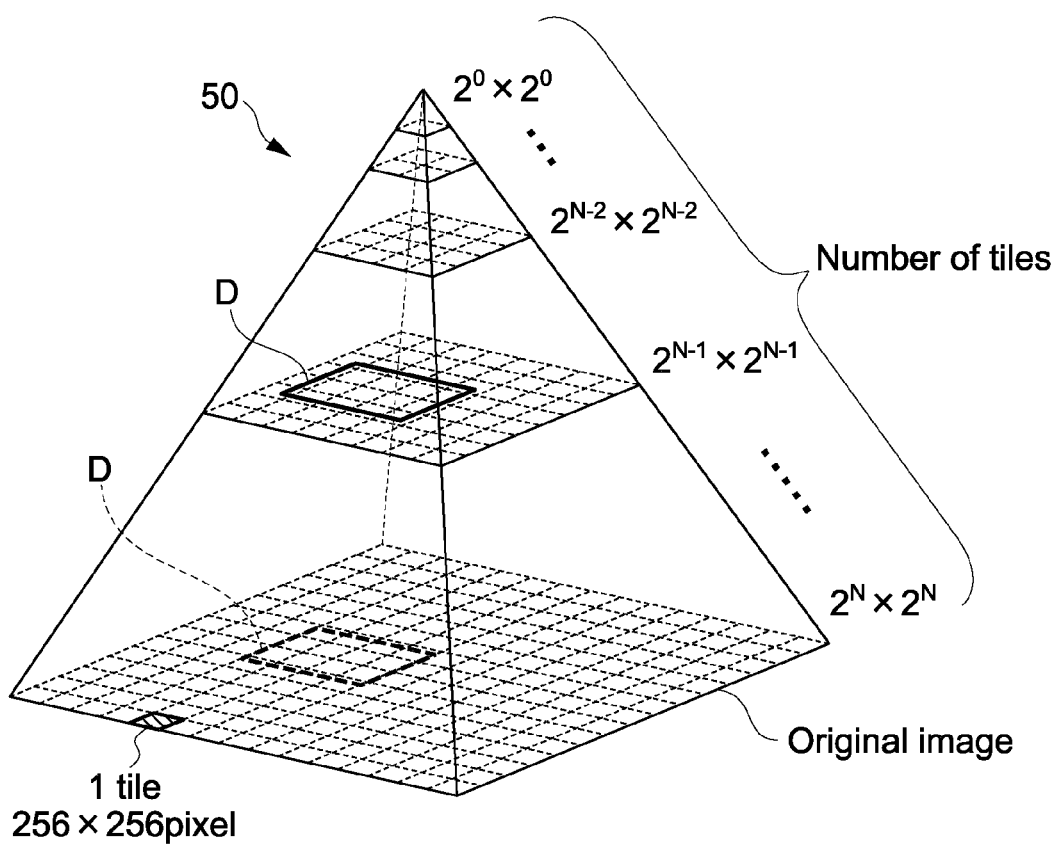
FIG. 2 is a diagram showing an example image pyramid structure for explaining a principle of displaying an image.

Next, a description will be given on an image that is obtained by an optical microscope (not shown) and is mainly stored in the storage unit 108 of the PC 100 and on a principle of displaying the image. FIG. 2 is a diagram for explaining image data obtained by an optical microscope (not shown) stored mainly in the storage unit 108 of the PC 100.

An image pyramid structure 50 in this embodiment is an image group generated at a plurality of different resolutions with respect to one image obtained from one observation target object 15 (see, FIG. 3) by the optical microscope. The images are a plurality of image data of one observation target object obtained at a plurality of different focuses by the optical microscope. This is called "Z-stack", which is a function to deal with the case where tissues or cells may have different shapes also in the thickness direction of the observation target object 15. A scanner apparatus has the Z-stack function in many cases, and generates images of 5 to 10 layers or 10 to 30 layers. Hereinafter, a description will be given on the image pyramid structure 50 of one image of a plurality of images.

As shown in FIG. 2, image data obtained from one observation target object 15 (see, FIG. 3) by the optical microscope are stored and controlled as the image pyramid structure. The image pyramid structure includes a plurality of image data whose resolutions are reduced stepwise from an original image data, set in a tiered manner. The image data of each tier is blocked into areas called "tiles" of a predetermined resolution. In the operations of changing a display range of a displayed image or enlarging/reducing the size of an image, by loading required tiles from where they are stored on a display buffer, the operation can be made at high speed. Note that a resolution of one tile is, for example, 256×256 (pixel) or 256×512 (pixel).

Herein, the image pyramid structure of FIG. 2 includes N tiers. The N tiers are referred to as Nth tier, N−1th tier, N−2th tier, . . . , 0th tier, respectively. The number of tiles in those tiers are $2^N \times 2^N$, $2^{N-1} \times 2^{N-1}$, $2^{N-2} \times 2^{N-2}$, . . . , 1, respectively.

That is, when the display unit 106 displays those images at the same magnification, for example, 100%, (displays each image by the number of dots that is physically the same as the number of pixels of the images), the largest image is displayed in the largest size, and the smallest image is displayed in the smallest size. Here, a display range of the display unit 106 is represented by D in FIG. 2.

Figure 3:
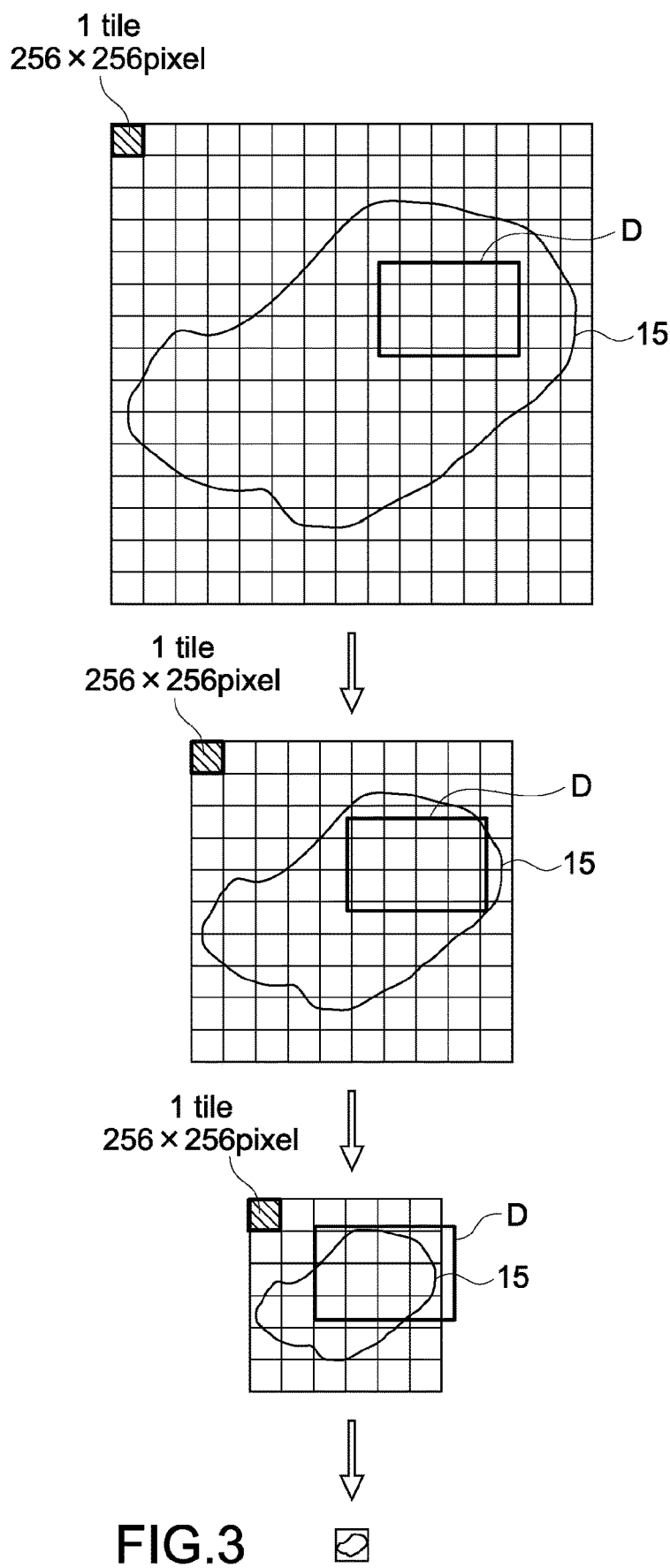
FIG. 3 is a diagram for explaining an example procedure at a time when an image group of the image pyramid structure of FIG. 2 is generated.

FIG. 3 is a diagram for explaining a procedure at a time when the image group of the image pyramid structure 50 is generated.

First, a digital image being an original image is obtained at a predetermined observation magnification by an optical microscope (not shown). The original image corresponds to the largest image which is the lowermost image of the image pyramid structure 50 of FIG. 2. That is, the original image is the image of the highest resolution. Accordingly, as the lowermost image of the image pyramid structure 50, an image observed at a relatively high magnification and obtained by an optical microscope is used.

Note that, in the field of pathology, generally, a matter obtained by slicing an organ, a tissue, or a cell of a living body, or a part thereof is an observation target object 15. Then, a scanner apparatus (not shown) having a function of the optical microscope reads the observation target object 15 stored in a glass slide, to obtain a digital image and store the obtained digital image into the scanner apparatus or another storage apparatus.

The scanner apparatus or a general-purpose computer (not shown) generates, as shown in FIG. 3, from the largest image obtained as described above, a plurality of images whose resolutions are reduced stepwise, and stores those images in unit of "tile" that is a unit of a predetermined size, for example. The size of one tile is 256×256 (pixel), for example. The image group generated as described above forms the image pyramid structure 50, and the storage unit 108 of the PC 100 stores the image pyramid structure 50. Actually, the PC 100 only has to store the images whose resolutions are different with the images being associated with resolution information items, respectively. It should be noted that the generating and storing the image pyramid structure 50 may be performed by the PC 100 shown in FIG. 1.

The PC 100 uses software that employs the system of the image pyramid structure 50, to extract a desired image from the image pyramid structure 50 and output the desired image to the display unit 106 in accordance with an input operation through the input unit 107 by the user. Specifically, the PC 100 displays an image of an arbitrary part selected by the user, out of the images at an arbitrary resolution selected by the user. With this operation, the user can get a feeling of observing the observation target object 15 while changing the observation magnification. That is, the PC 100 functions as a virtual microscope. A virtual observation magnification in this case corresponds to a resolution in reality.

[Functional Structure of Information Processing Apparatus]

Figure 4:
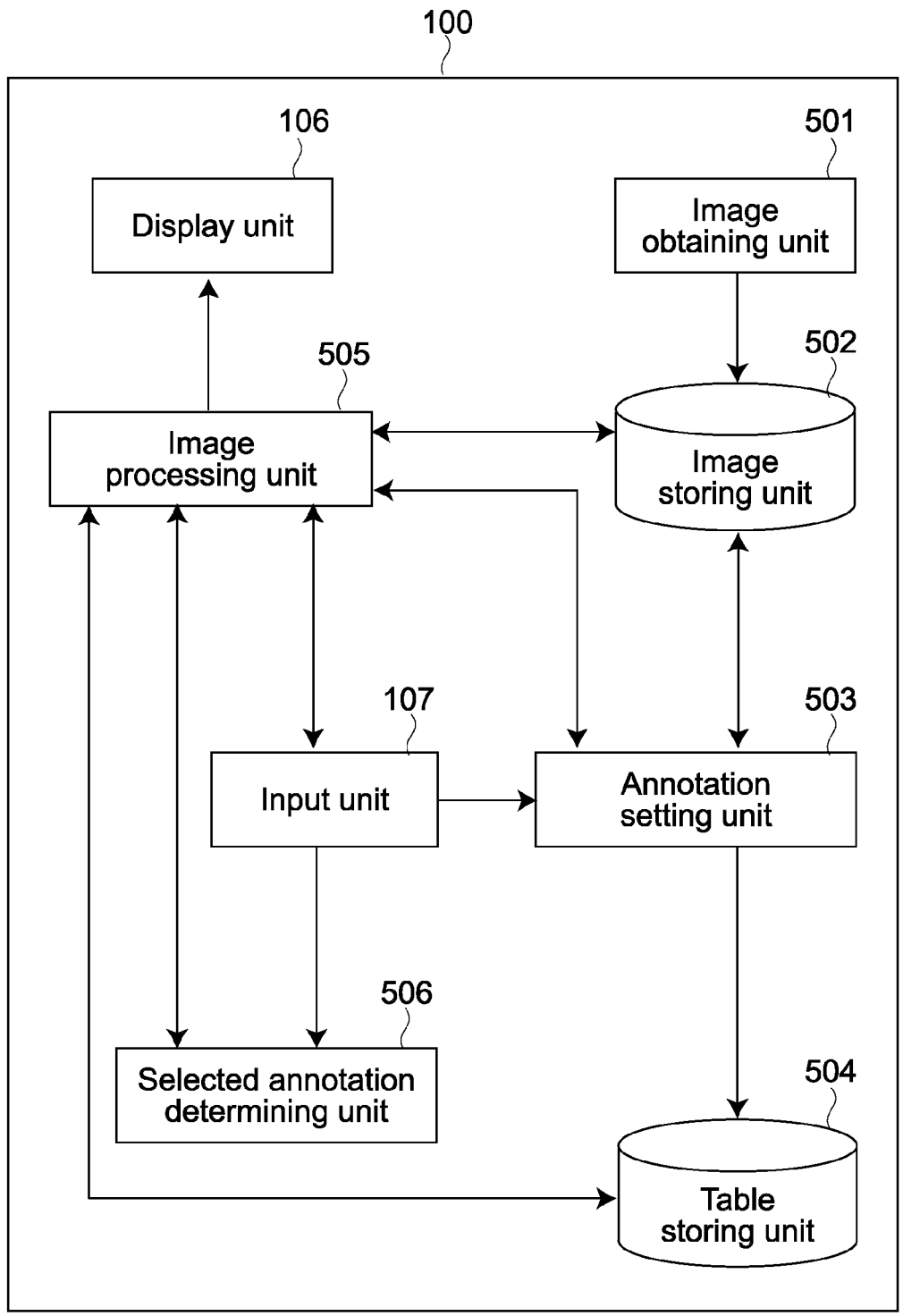
FIG. 4 is a functional block diagram showing an example information processing apparatus.

FIG. 4 is a functional block diagram showing the PC 100.

The PC 100 is capable of realizing an annotation function. Herein, the annotation function is a function in which position information or content information is set in relation with an arbitrary portion in an image, for example, a portion which may have a disorder, and an image visually compounded with the position information or the content information is displayed. Further, a displayed mark obtained by visually compounding the position information with the image is referred to as "annotation mark". A displayed comment obtained by readably compounding the content information with the image is referred to as "annotation comment".

The PC 100 includes an image obtaining unit 501, an image storing unit 502, an annotation setting unit 503 (setting unit), a table storing unit 504, an image processing unit 505 (processing unit), a selected annotation determining unit 506 (selecting unit), a display unit 106, and an input unit 107. These functional units are achieved in a computer resource based on a program loaded on the RAM 103. The image obtaining unit 501 (Obtaining unit) obtains an image via a network or an image stored in the removable recording medium 111, and stores the obtained image in the image storing unit 502. The image storing unit 502 is set in the storage unit 108, the removable recording medium 111, or the like.

The annotation setting unit 503 (setting unit) causes a user to select a display range (for example, one predetermined tile) of an image displayed on the display screen and to select the layer number of the Z-stack, that is, a position and the like in the optical axis direction, and obtains the selecting result. Obtaining the selecting result, the annotation setting unit 503 generates a control table (see, FIG. 5) in association with the display range of the image in the table storing unit 504. The table storing unit 504 is set in the RAM 103. Next, the annotation setting unit 503 registers, as the value of the Z number, the value of 1 to N each representing the position of the layer of the image including the display range in the control table generated in the table storing unit 504. The annotation setting unit 503 registers annotation position information and annotation content information set through the input unit 107 by a user in relation with the value of the Z number in the control table. Operations for setting an annotation on an image of a predetermined layer as described above will be explained later as "operation of annotation setting".

A user inputs various orders and data through the input unit 107. For example, through rotation of the dial-type knob of the input unit 107 by a user, the layer of a displayed image can be changed. For example, through rotation of the dial-type knob of the input unit 107 by a user, images of different layers can be displayed. Accordingly, a user can observe images while changing the layers of the displayed images as if the user observes an observation target object by changing focuses through rotation of a focus dial of an actual microscope. Further, by selecting an annotation mark displayed on the display screen through the input unit 107 by a user, an image of a layer on which the annotation is set can be displayed on the display screen, or a comment representing content information of the annotation can be displayed on the display screen.

The image processing unit 505 (processing unit) causes a user to select on/off settings of a Z-through display mode, and obtains the selecting result. The "Z-through display mode" is a mode in which all the annotation marks set on images of a plurality of layers different in the optical axis are displayed. The image processing unit 505 obtains an order to change a layer of a displayed image input through the input unit 107 by a user, and in accordance with the order, obtains image data stored in the image storing unit 502 or annotation position information stored in the table storing unit 504. The image processing unit 505 compounds the image data obtained from the image storing unit 502 with an annotation mark, which is obtained by visually reflecting the annotation position information, and expands the compound display information in a buffer. Accordingly, an image including an annotation mark is displayed on the display screen. Operations for displaying an image including an annotation mark as described above will be explained later as "operation of annotation mark display".

The selected annotation determining unit 506 (selecting unit) obtains an order for jump display and an order for displaying an annotation comment input through the input unit 107 by a user. Herein, each order may be input with an operation such as a few clicks of the mouse of the input unit 107 by a user in a state where a cursor is displayed in an area surrounded by an annotation mark included in an image displayed on the display screen, for example. Obtaining the order for jump display and the order for displaying an annotation comment, the selected annotation determining unit 506 notifies the image processing unit 505 of a detecting result including annotation position information of the selected annotation.

Further, the image processing unit 505 changes the layer of a displayed image in accordance with the order for jump display obtained from the selected annotation determining unit 506. Operations for changing the layer of a displayed image in accordance with the order for jump display as described above will be explained later as "operation of jump display". The image processing unit 505 compounds a displayed image with an annotation comment in accordance with the order for displaying an annotation comment obtained from the selected annotation determining unit 506. Operations for compounding an annotation comment in accordance with the order for displaying an annotation comment as described above will be explained later as "operation of annotation comment display".

[Operations of Information Processing Apparatus]

Next, a description will be given on operations of the PC 100. The description will be given in the following order: (1) Operation of annotation setting; (2) Operation of annotation mark display; (3) Operation of jump display; (4) Modified example of operation of jump display; and (5) Operation of annotation comment display.

[(1) Operation of Annotation Setting]

First, a description will be given on the operation of annotation setting.

The image obtaining unit 501 obtains an image via a network or an image stored in the removable recording medium 111, and stores the obtained image in the image storing unit 502.

Figure 5:
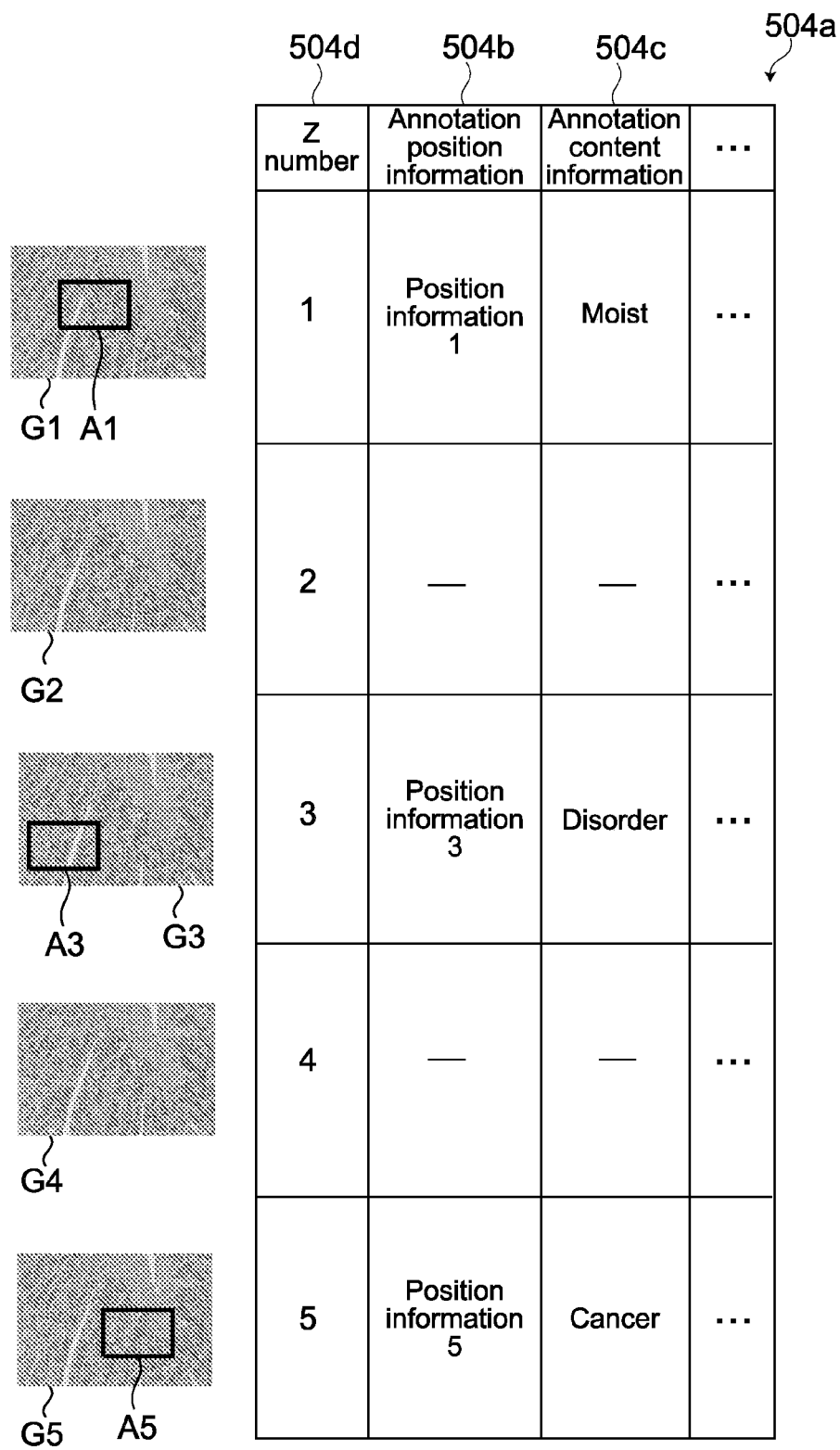
FIG. 5 is a diagram showing an example control table.

The annotation setting unit 503 causes a user to select a display range (for example, one predetermined tile), the layer number of the Z-stack, that is, a position in the optical axis direction, and the like of an image to be displayed on the display screen, and obtains the selecting result. Obtaining the selecting result, the annotation setting unit 503 generates a control table 504a in association with the display range of the image in the table storing unit 504. Next, as shown in FIG. 5, the annotation setting unit 503 registers the value of 1 to N each representing the position of the layer of the image including the display range in the control table 504a generated in the table storing unit 504 as the value of the Z number 504d. Note that, in the control table 504a of FIG. 5, the values of 1 to 5 are stored as the values of the Z number 504d.

Then, the annotation setting unit 503 notifies the image processing unit 505 of information with regard to the display range and the value of the Z number included in the obtained selecting result. Based on the information with regard to the display range and the value of the Z number in the notification, the image processing unit 505 obtains image data from the image storing unit 502 and generates display information, and expands the display information in the display buffer. The display information stored in the display buffer is supplied to the display unit 106. Based on the supplied display information, the display unit 106 displays an image on the display screen.

An annotation can be set on an arbitrary portion in the displayed image through the mouse or the keyboard of the input unit 107 by a user. Specifically, position information of the arbitrary portion is set as annotation position information by the user. The annotation setting unit 503 obtains the annotation position information set through the input by the user. Then, the annotation setting unit 503 registers the annotation position information obtained through the input unit 107 as annotation position information 504b in relation with the value of the Z number 504d in the control table 504a.

Then, the annotation setting unit 503 notifies the image processing unit 505 of the registered annotation position information. Based on the annotation position information included in the notification, the image processing unit 505 compounds an image G1 now displayed on the display screen with an annotation mark, which is obtained by visually reflecting the annotation position information. Herein, the annotation mark may be any mark as long as a user can visually recognize a portion set with an annotation through display information, such as a predetermined-shaped frame. The image processing unit 505 expands the compound display information (image data including annotation mark) in the display buffer. The display information stored in the display buffer is supplied to the display unit 106. Accordingly, an image including an annotation mark is displayed on the display screen of the display unit 106.

Content information with regard to the set annotation can be registered through the mouse or the keyboard of the input unit 107 by a user. The content information with regard to an annotation is, for example, a comment with regard to the annotation by a user or the like. The annotation setting unit 503 registers the content information with regard to an annotation input through the input unit 107 as annotation content information 504c in relation with the value of the Z number 504d in the control table 504a.

Further, an image of another layer can be displayed and an annotation can be set with respect to an arbitrary portion in the newly-displayed image through an operation of the mouse or the keyboard of the input unit 107 by a user.

[(2) Operation of Annotation Mark Display]

Next, a description will be given on the operation of annotation mark display.

Figure 6:
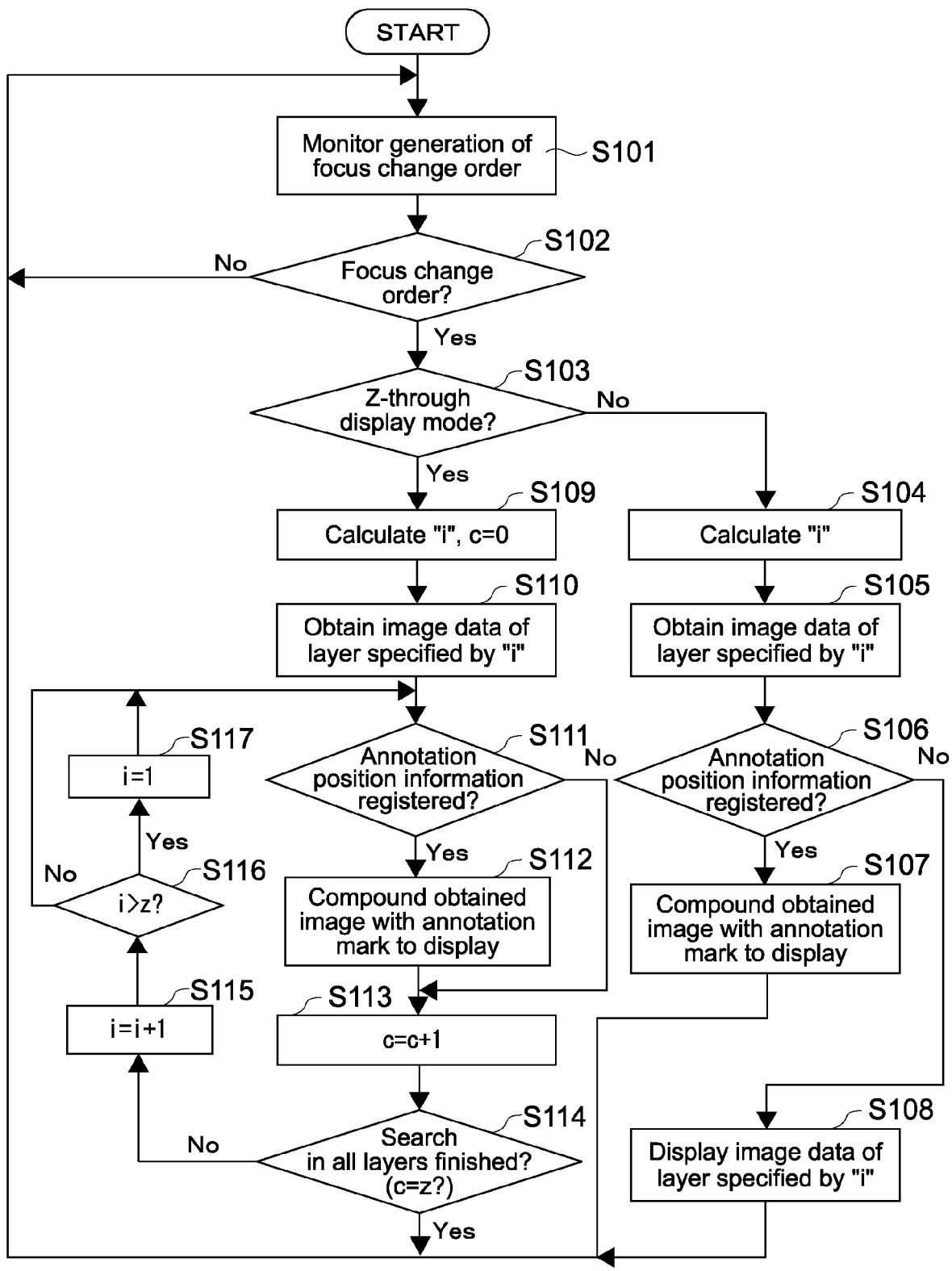
FIG. 6 is a flowchart showing an example operation of annotation mark display.

FIG. 6 is a flowchart showing the operation of annotation mark display.

The description will be given on the condition that the control table 504a is generated through (1) the operation of annotation setting. Further, in the set of the Z-stack of the display range in association with the control table 504a, an image of a layer specified by a predetermined value of the Z number is displayed on the display screen of the display unit 106. Note that the image may include an annotation mark. That is, in a case where annotation position information is registered in relation with the value of the Z number of the image in the control table 504a, an image including an annotation mark generated based on the annotation position information is displayed on the display screen. Meanwhile, in a case where annotation position information is not registered in relation with the value of the Z number of the image in the control table 504a, an image including no annotation mark is displayed on the display screen.

In the state where an image including an annotation mark or an image including no annotation mark is displayed on the display screen of the display unit 106 as described above, the image processing unit 505 monitors generation of an order to change a layer of a displayed image input through the input unit 107 by a user (hereinafter referred to as "focus change order") (Step S101). Herein, the focus change order may be input through operations of an input apparatus including a dial-type knob connected to the PC 100. By using such an input apparatus including a dial-type knob, a user can observe images while changing the layers of the displayed images as if the user observes an observation target object by changing focuses by rotating a focus dial of an actual microscope.

Obtaining the focus change order (Yes in Step S102), the image processing unit 505 determines if the Z-through display mode is set or not (Step S103). The Z-through display mode may be previously set by a user. Alternatively, the Z-through display mode may be set by a user when inputting the focus change order.

First, a description will be given on the case where the Z-through display mode is not set (No in Step S103).

The image processing unit 505 calculates the value "i" of the Z number of a focus change target based on parameter information included in the focus change order input through the input unit 107 such as a rotation amount, a rotation speed, and a rotation direction of the dial-type knob, for example (Step S104). The image processing unit 505 obtains image data of the layer specified by the value "i" of the Z number from the image storing unit 502 (Step S105). Then, the image processing unit 505 examines if annotation position information is registered or not in relation with the value "i" of the Z number in the control table 504a (Step S106). In a case where the annotation position information is registered (Yes in Step S106), the image processing unit 505 compounds the image data obtained from the image storing unit 502 with an annotation mark, which is obtained by visually reflecting the annotation position information, and expands the compound display information in a display buffer. Accordingly, an image including an annotation mark of a layer corresponding to the value "i" of the Z number is displayed on the display screen (Step S107). After that, the image processing unit 505 returns to the state of monitoring generation of a focus change order input through the input unit 107 by a user (Step S101).

Note that in a case where the annotation position information is not registered in relation with the value "i" of the Z number in the control table 504a (No in Step S106), the image processing unit 505 merely expands image data in the display buffer. Accordingly, an image including no annotation mark is displayed on the display screen of the display unit 106 (Step S108). After that, the image processing unit 505 returns to the state of monitoring generation of a focus change order (Step S101).

Next, a description will be given on the case where the Z-through display mode is set (Yes in Step S103).

Determining that the Z-through display mode is set, the image processing unit 505 calculates the value "i" of the Z number of the focus change target based on the parameter information included in the focus change order input through the input unit 107, and sets "0" as a default in a "c" being a variable indicating the number of layers having been searched in the Z-stack (Step S109). Next, the image processing unit 505 obtains image data of the layer specified by the value "i" of the Z number of the focus change target from the image storing unit 502 (Step S110). Then, the image processing unit 505 examines if annotation position information is registered or not in relation with the value "i" of the Z number in the control table 504a (Step S111). In a case where the annotation position information is registered (Yes in Step S111), the image processing unit 505 compounds the image data obtained from the image storing unit 502 with an annotation mark, which is obtained by visually reflecting the annotation position information, and expands the compound display information in a buffer. Accordingly, an image including an annotation mark of a layer corresponding to the value "i" of the Z number is displayed on the display screen (Step S112). Then, the operation proceeds to Step S113. In a case where the annotation position information is not registered (No in Step S111), the operation of compounding the annotation mark is skipped, and the operation proceeds to Step S113.

In Step S113, the image processing unit 505 increments the value "c". After that, the image processing unit 505 judges whether the annotation position information is searched in all the layers in the Z-stack in Step S105. That is, the image processing unit 505 judges if the condition of c=z is established or not, "z" being the number of all the layers in the Z-stack (Step S114). In a case where the condition of c=z is not established (No in Step S114), the image processing unit 505 increments the value "i" of the Z number (Step S115). Next, the image processing unit 505 examines if the value "i=i+1" of the Z number obtained by the increment is larger than "z" or not (Step S116). Herein, a description will be given on a case where the value "i=i+1" is not larger than "z". In this case, the image processing unit 505 returns to Step S111, and examines if annotation position information is registered or not in relation with the value "i+1" of the Z number obtained by the increment. In a case where the annotation position information is registered, the image processing unit 505 further compounds the compound display information with an annotation mark, which is obtained by visually reflecting the annotation position information (Step S112). Further, in a case where the value of the Z number of the focus change target is larger than "1", before the annotation position information is searched in all the layers in the Z-stack, the value "i=i+1" becomes larger than "z" in Step S116 (Yes in Step S116). In this case, the image processing unit 505 sets "1" as the value "I" of the Z number (Step S117), and then, in a case where the annotation position information is registered in relation with the value "1" of the Z number, further compounds the displayed image having been compounded with the annotation mark obtained by visually reflecting the annotation position information (Step S112). As a result, the operations of Step S111 and Step S112 are repeated for z times. The annotation marks with regard to all the annotations set in the Z-stack are thus Z-through displayed. After that, the image processing unit 505 again returns to the state of monitoring generation of a focus change order input through the input unit 107 by a user (Step S101).

Figure 7A:
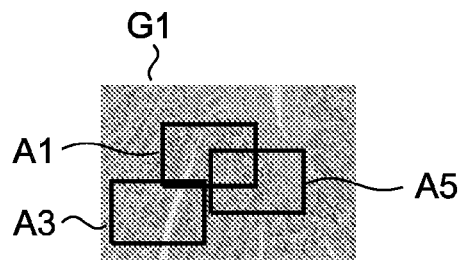
FIGS. 7A to 7D are diagrams showing display examples of annotation mark display.

Herein, a description will be given on a specific example of this flow. The description will be given on the condition that the Z-through display mode is previously set by a user. Further, the control table 504a of FIG. 5 is generated through (1) the operation of annotation setting. Further, the image G1 of the layer specified by the value "i=1" of the Z number registered in the control table 504a is compounded with an annotation mark A1, which is obtained by visually reflecting the annotation position information registered in relation with the value "i=1" of the Z number, an annotation mark A3, which is obtained by visually reflecting the annotation position information registered in relation with the value "i=3" of the Z number, and an annotation mark A5, which is obtained by visually reflecting the annotation position information registered in relation with the value "i=5" of the Z number, to be displayed on the display screen (see, FIG. 7A). Then, in this state, "change focus to next layer" is input as a focus change order by a user.

Figure 7B:
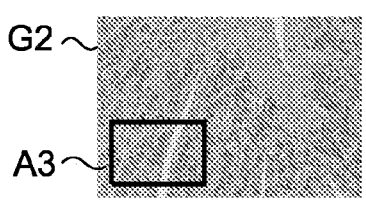

In this case, based on the "change focus to next layer" order input through the input unit 107, the image processing unit 505 calculates the Z value "i=2" of an image of the focus change target. The image processing unit 505 obtains image data of the layer specified by the value "i=2" of the calculated Z number from the image storing unit 502. Subsequently, because annotation position information is not registered in relation with the calculated value "i=2" of the Z number of the image to be displayed next in the control table 504a, the image processing unit 505 skips the operation of compounding the annotation mark. After that, the image processing unit 505 increments the value "i=2" of the Z number. Because annotation position information is registered in relation with the calculated value "i=3" of the Z number in the control table 504a, the image processing unit 505 compounds the image data with an annotation mark A3, which is obtained by visually reflecting the annotation position information, and expands the compound display information in a buffer. Accordingly, an image including the annotation mark A3 is displayed on the display screen (See FIG. 7B).

Figure 7C:
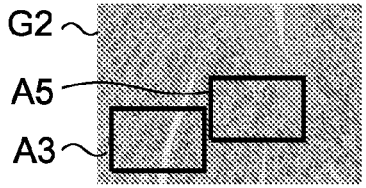
Figure 7D:
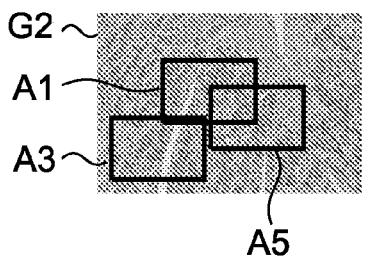

After that, in the similar manner, the image processing unit 505 changes the value "i" of the Z number in the order of "4", "5", "1". In each case, the image processing unit 505 further compounds the compound display information with an annotation mark, which is obtained by visually reflecting the annotation position information registered in relation with the value "i" of the Z number after the change in the control table 504a. Then, the image processing unit 505 expands the compound display information in the display buffer. Accordingly, an image including annotation marks is Z-through displayed on the display screen in a manner that the number of displayed annotation marks is increased one by one (FIGS. 7C and 7D). After all the annotation marks are displayed as described above, the image processing unit 505 returns to the state of monitoring generation of a focus change order input through the input unit 107 by a user.

According to the Z-through display mode, even in a case where shapes and the like of a tissue or a cell of an observation target object are different in the optical axis direction of a microscope, it is possible to compound one image with a plurality of annotations set on images of a plurality of different layers, respectively, to be displayed. Accordingly, in a case where an image on which an annotation is set and an image on which an annotation is not set are mixed in a Z-stack, annotation marks can be displayed on the image on which an annotation is not set. So, irrespective of a speed of changing displayed images, it is possible to avoid a risk of missing an annotation included in an image which locates at the middle of the images by a user. Further, a user such as a pathologist can investigate a disorder carefully with reference to a plurality of annotation marks, and therefore a risk of missing a disorder is decreased.

Note that, in the above description, the image processing unit 505 compounds an image with annotation marks, which are obtained by visually reflecting all the annotation position information registered in the control table 504a, but not limited to the above. The image processing unit 505 may compound an image with annotation marks, which are obtained by visually reflecting some annotation position information out of all the annotation position information registered in the control table 504a. Accordingly, in a case of displaying an image of a predetermined layer on the display screen, the image is compounded with an annotation mark, which is obtained by visually reflecting annotation position information set on a different layer. Accordingly, even in a case where a layer of a displayed image is changed, an image including an annotation mark set on a different layer can be displayed. As a result, it is possible to avoid a risk of missing an annotation mark by a user.

Further, in a case where the Z-through display mode is set, the image processing unit 505 may compound an image with annotation marks in a manner that a positional relationship of layers of images on which annotations are set is reflected. Accordingly, a user can intuitively understand the positional relationship in the optical axis direction between a layer of an image on which an annotation is set and a layer of the displayed image.

Specifically, in Step S105, the image processing unit 505 calculates the difference between the value of the Z number specifying a layer of a displayed image and the Z number registered in relation with annotation position information of a displayed annotation mark in the control table 504a. As the value of the Z number, 1 to N each representing the position of the layer of the image are registered in the control table 504a. So the difference of values of the Z number is smaller, the distance between the layers is smaller. Further, the difference of values of the Z number is larger, the distance between the layers is larger. By changing styles of displayed annotation marks based on the difference of values of the Z number, the annotation marks can be distinguishably displayed in a manner that a positional relationship in the optical axis direction between a layer of an image on which an annotation is set and a layer of the displayed image are reflected. For example, the image processing unit 505 changes, in accordance with the difference of values of the Z number, colors, brightness, chroma, alpha blend values, widths of lines, styles of lines, and the like of annotation marks. Accordingly, a user can intuitively understand the positional relationship in the optical axis direction between a layer of an image on which an annotation is set and a layer of the displayed image. Specifically, the difference of values of the Z number is larger, the colors of annotation marks may be lighter. Alternatively, the difference of values of the Z number is larger, the width of lines of annotation marks may be thinner. Alternatively, the difference of values of the Z number is larger, the annotation marks may be more opaque. Alternatively, the difference of values of the Z number is larger, the alpha blend value may be more decreased to increase clarity of annotation marks. According to the above-mentioned compound processing, a user can intuitively understand the positional relationship between a layer of the displayed image and layers of images including annotation marks.

As described above, annotation marks are distinguishably displayed on the display screen in a manner that a positional relationship in the optical axis direction between images are reflected, a user can intuitively understand the positional relationship between a layer of the image displayed on the display screen and layers of images including annotation marks. Further, the user can select an image to be displayed with reference to the annotation marks. For example, in a case where an image including a plurality of annotation marks is displayed, a user wishes to cause an image of a layer on which one of the annotations is set to be displayed. The user can select the layer of the image to be displayed through the input unit 107 while paying attention to the change of the styles of the annotation. So it is possible to change a displayed image to an image of a predetermined layer easily and reliably. Accordingly, a risk of missing a disorder by a user such as a pathologist is decreased.

[(3) Operation of Jump Display]

Next, a description will be given on the operation of jump display.

Figure 9:
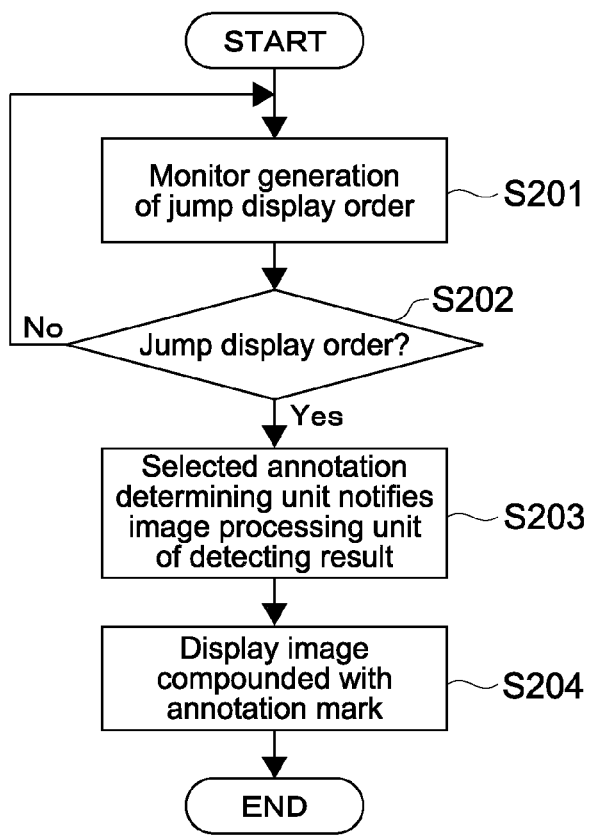
FIG. 9 is a flowchart showing an example operation of jump display.

FIG. 9 is a flowchart showing the operation of jump display.

The description will be given on the condition that the Z-through mode is previously set by a user. Further, the control table 504a is generated through (1) the operation of annotation setting. Further, in the set of the Z-stack of the display range in association with the control table 504a, an image of a layer specified by a predetermined value of the Z number is displayed on the display screen of the display unit 106. Further, annotation marks set on a plurality of different layers are Z-through displayed through (2) the operation of annotation mark display.

In the state where an image including annotation marks is displayed on the display screen as described above, the selected annotation determining unit 506 monitors generation of an order to change a layer of a displayed image input through the input unit 107 by a user (hereinafter referred to as "jump display order") (Step S201). Herein, the jump display order may be input with an operation such as a few clicks of the mouse of the input unit 107 by a user in a state where a cursor is displayed in an area surrounded by an annotation mark included in an image displayed on the display screen.

Obtaining the jump display order (Yes in Step S202), the selected annotation determining unit 506 notifies the image processing unit 505 of a detecting result including annotation position information of the selected annotation (Step S203).

Obtaining the detecting result including the annotation position information from the selected annotation determining unit 506, the image processing unit 505 cancels the Z-through display mode setting. Further, the image processing unit 505 obtains the value of the Z number registered in association with annotation position information included in the detecting result in the control table 504a. Obtaining the value of the Z number, the image processing unit 505 obtains image data of a layer specified by the obtained value of the Z number as image data to be displayed next from the image storing unit 502. The image processing unit 505 compounds the obtained image data with an annotation mark, which is obtained by visually reflecting the annotation position information included in the detecting result obtained from the selected annotation determining unit 506, and expands the compound display information in the display buffer. Accordingly, an image including an annotation mark is displayed on the display screen (Step S204).

Herein, a description will be given on a specific example of this flow. The description will be given on the condition that the Z-through display mode is previously set by a user. Further, the control table 504a of FIG. 5 is generated through (1) the operation of annotation setting. Further, an image G3 of the layer specified by the value "i=3" of the Z number registered in the control table 504a is compounded with annotation marks A1, A3, A5, which are obtained by visually reflecting the annotation position information registered in the control table 504a, to be Z-through displayed on the display screen. Then, in this state, the annotation mark A1 is selected by a user as the jump display order.

Figure 10:
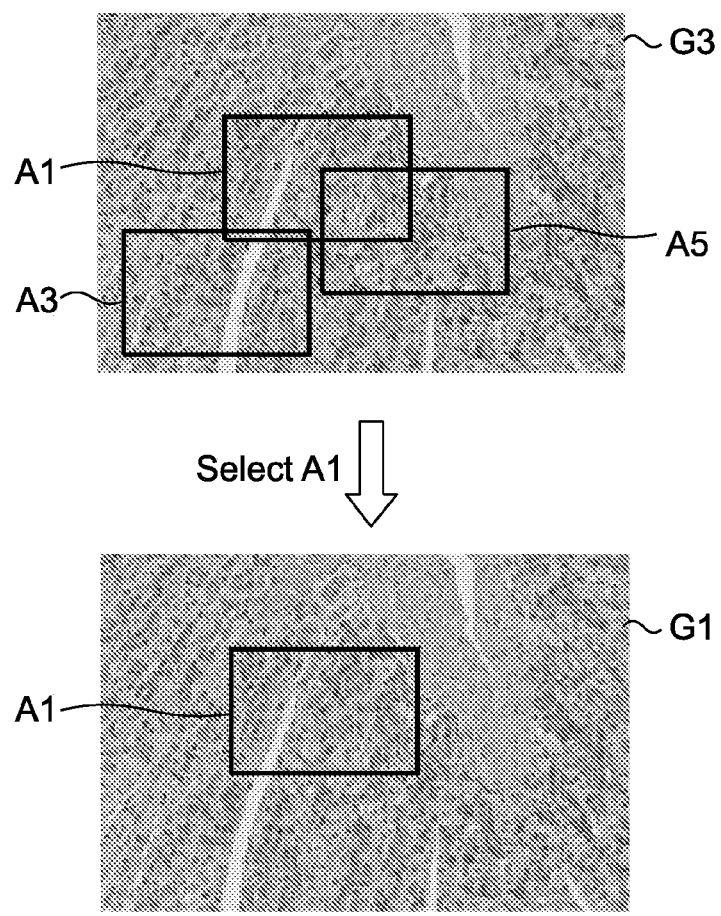
FIG. 10 is a diagram showing an display example of jump display.

In this case, the image processing unit 505 obtains the jump display order (Yes in Step S202), and notifies the image processing unit 505 of a detecting result including annotation position information of the selected annotation mark A1 (Step S203). Obtaining the detecting result including the annotation position information from the selected annotation determining unit 506, the image processing unit 505 cancels the Z-through display mode setting. Then, the image processing unit 505 obtains the value "i=1" of the Z number registered in relation with annotation position information included in the detecting result in the control table 504a. Obtaining the value "i=1" of the Z number, the image processing unit 505 obtains image data of a layer specified by the obtained value "i=1" of the Z number as image data to be displayed next from the image storing unit 502. The image processing unit 505 compounds the obtained image data with the annotation mark A1, which is obtained by visually reflecting annotation position information included in the detecting result obtained from the selected annotation determining unit 506, and expands the compound display information in the display buffer. Accordingly, as shown in FIG. 10, the image G1 including the annotation mark A1 is displayed on the display screen (Step S204).

According to the jump display function, through input operation with respect to an annotation mark, the display can be switched over to an image on which the annotation is set. For example, in a case where a disorder may exist in an image of the displayed layer, by changing over the display to an image of a different layer, a user can confirm if there is a disorder or not again. Accordingly, a user such as a pathologist can investigate a disorder more carefully, and therefore a risk of missing a disorder is decreased.

In the above description, in Step S204, the image processing unit 505 cancels the Z-through display mode setting, but not limited to the above. Obtaining the detecting result including the annotation position information from the selected annotation determining unit 506, the image processing unit 505 may compound the image data obtained from the image storing unit 502 with a plurality of annotation marks having been displayed and may expand the compound result in the display buffer without canceling the Z-through display mode setting. Note that the same is equally true of a case where the phrase such as "to cancel the Z-through display mode setting" is used in the following description.

Accordingly, display can be changed over repeatedly between images of a plurality of different layers on which annotations are set, respectively. So images of a plurality of different layers can be displayed alternately. For example, in a case where there may be a disorder in an image of the displayed layer, an image of a different layer is displayed and a user can confirm if there is the disorder or not again, and after that, the image which was displayed at first is displayed again and the user can confirm if there is the disorder or not again. Accordingly, a user such as a pathologist can investigate a disorder more carefully, and therefore a risk of missing a disorder is decreased.

[(4) Modified Example of Operation of Jump Display]

Next, a description will be given on a modified example of the operation of jump display. In this modified example, a display processing is performed such that the selected annotation mark is arranged on an approximately center portion of an image displayed on the display screen.

Figure 11:
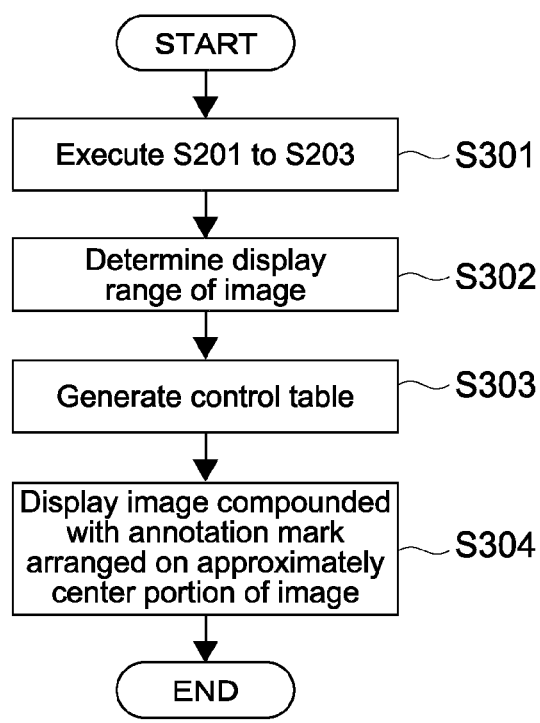
FIG. 11 is a flowchart showing a modified example of the operation of jump display.

FIG. 11 is a flowchart showing the modified example of the operation of jump display The description will be given on the condition that the Z-through mode is previously set by a user. Further, the control table 504a is generated through (1) the operation of annotation setting. Further, in the set of the Z-stack of the display range in association with the control table 504a, an image of a layer specified by a predetermined value of the Z number is displayed on the display screen of the display unit 106. Further, a plurality of annotation marks are Z-through displayed through (2) the operation of annotation mark display.

In the state where an image including annotation marks is displayed on the display screen, the selected annotation determining unit 506 performs the processing of Step S201 to Step S203 (Step S301). That is, in the state where an image including annotation marks is displayed on the display screen, the selected annotation determining unit 506 monitors generation of a jump display order input through the input unit 107 by a user (Step S201).

Obtaining the jump display order (Yes in Step S202), the selected annotation determining unit 506 notifies the image processing unit 505 of a detecting result including annotation position information of the selected annotation (Step S203).

Obtaining the detecting result including the annotation position information from the selected annotation determining unit 506, the image processing unit 505 obtains the value of the Z number registered in association with annotation position information included in the detecting result in the control table 504a.

Obtaining the annotation position information from the selected annotation determining unit 506, the image processing unit 505 cancels the Z-through display mode setting. Then, the image processing unit 505 sets the annotation position information included in the detecting result as a reference position, and determines a display range of an image based on the reference position. Specifically, the image processing unit 505 determines a display range of an image in which an annotation mark specified by the annotation position information is displayed on an approximately center portion of the image, in the originally-displayed image (Step S302). The image processing unit 505 notifies the annotation setting unit 503 of the determined display range. The annotation setting unit 503 generates a control table corresponding to the display range obtained from the image processing unit 505, and stores the control table in the table storing unit 504 (Step S303).

Then, the image processing unit 505 obtains image data of a layer specified by the value of the Z number obtained from the control table and the position information with regard to the display range in the originally-displayed image calculated in Step S302, as image data to be displayed next from the image storing unit 502. The image processing unit 505 compounds the obtained image data with an annotation mark, which is obtained by visually reflecting the annotation position information in the detecting result obtained from the selected annotation determining unit 506, and expands the compound display information in the display buffer. Accordingly, an image including an annotation mark arranged on the approximately center portion of the image is displayed on the display screen (Step S304).

Accordingly, since an annotation mark can be displayed on an approximately center portion of a displayed image, a user can easily observe a portion in the vicinity of the portion on which the annotation mark is displayed. For example, in a case where there is a fear that a disorder may exist in the vicinity of a disorder in the portion on which the annotation mark is displayed, a user such as a pathologist can examine the disorder more carefully and a risk of missing a disorder is decreased.

[(5) Operation of Annotation Comment Display]

Next, a description will be given on the operation of annotation comment display.

Figure 12:
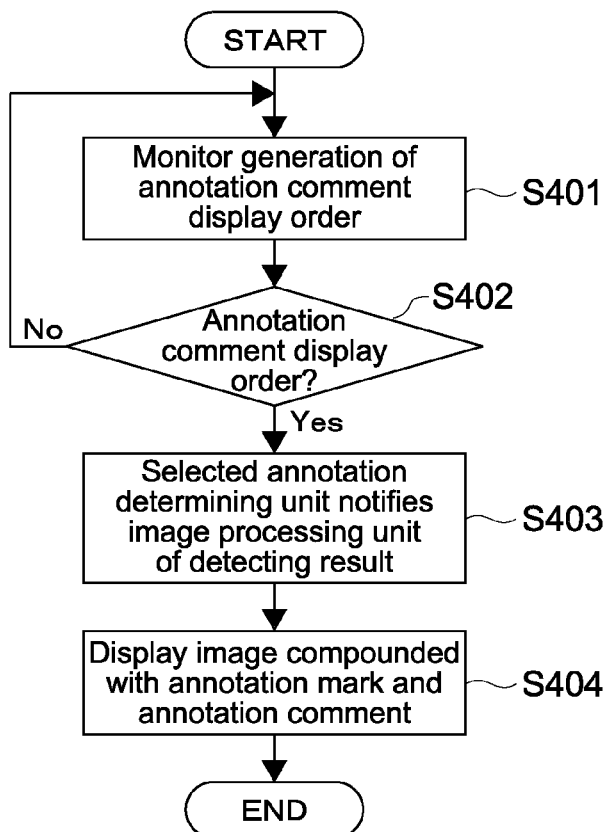
FIG. 12 is a flowchart showing an example operation of annotation comment display.

FIG. 12 is a flowchart showing the operation of annotation comment display.

The description will be given on the condition that the control table 504*a* is generated through (1) the operation of annotation setting. Further, in the set of the Z-stack of the display range in association with the control table 504*a*, an image of a layer specified by a predetermined value of the Z number is displayed on the display screen of the display unit 106. Further, an annotation mark or annotation marks is/are displayed through (2) the operation of annotation mark display.

In the state where an image including an annotation mark or annotation marks is displayed on the display screen as described above, the selected annotation determining unit 506 monitors generation of an order to display an annotation comment input through the input unit 107 by a user (hereinafter referred to as "annotation comment display order") (Step S401). Herein, the annotation comment display order may be input with an operation such as a few clicks of the mouse of the input unit 107 by a user in a state where a cursor is displayed in an area surrounded by an annotation mark included in an image displayed on the display screen.

Obtaining the annotation comment display order (Yes in Step S402), the selected annotation determining unit 506 notifies the image processing unit 505 of a detecting result including annotation position information of the selected annotation (Step S403).

Obtaining the detecting result including the annotation position information from the selected annotation determining unit 506, the image processing unit 505 cancels the Z-through display mode setting in a case where the Z-through display mode setting has been set. Then, the image processing unit 505 obtains annotation content information registered in relation with the annotation position information included in the detecting result in the control table 504*a*. Obtaining the annotation content information, the image processing unit 505 compounds the image including an annotation mark displayed on the display screen with an annotation comment, which is obtained by visually reflecting the obtained annotation content information, and expands the compound display information in the display buffer. Accordingly, an image obtained by compounding an image including an annotation mark with an annotation comment is displayed on the display screen (Step S404).

Herein, a description will be given on a specific example of this flow. The description will be given on the condition that the control table 504*a* is generated through (1) the operation of annotation setting. Further, in the set of the Z-stack of the display range in association with the control table 504*a*, the image G1 of the layer specified by the value "i=1" of the Z number is displayed on the display screen of the display unit 106. Further, an annotation mark A1 or a plurality of annotation marks including the annotation mark A1 is/are displayed on the display screen through (2) the operation of annotation mark display. Then, in this state, the annotation mark A1 is selected by a user as the annotation comment display order.

Figure 8:
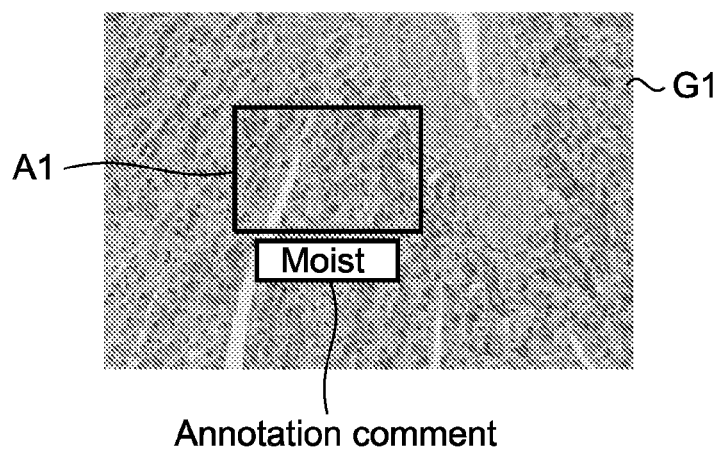
FIG. 8 is a diagram showing a display example of annotation comment display.

In this case, the selected annotation determining unit 506 obtains the annotation comment display order (Yes in Step S402), and notifies the image processing unit 505 of a detecting result including annotation position information of the selected annotation mark A1 (Step S403). Obtaining the detecting result including the annotation position information from the selected annotation determining unit 506, the image processing unit 505 cancels the Z-through display mode setting in a case where the Z-through display mode setting has been set. Then, the image processing unit 505 obtains annotation content information "Disorder" registered in relation with the annotation position information included in the detecting result in the control table 504*a*. Obtaining the annotation content information "Disorder", the image processing unit 505 compounds the image G1 including the annotation mark A1 displayed on the display screen with an annotation comment, which is obtained by visually reflecting the obtained annotation content information "Disorder", and expands the compound display information in the display buffer. Accordingly, as shown in FIG. 8, an image obtained by compounding the image G1 including the annotation mark A1 with the annotation comment is displayed on the display screen (Step S404).

According to the annotation comment display function, an annotation can be readably displayed. So the annotation comment display function is useful in a case of performing an examination, a diagnosis, or the like while displaying content information with regard to a portion to which a user paid attention before, or in a case where a user wishes to review content information which was set by another user, for example.

The operation of annotation mark display, the operation of jump display, and the operation of annotation comment display can be on/off by using the input unit 107.

It should be understood by those skilled in the art that various modifications, combinations, sub-combinations and alterations may occur depending on design requirements and other factors insofar as they are within the scope of the appended claims or the equivalents thereof.

In the above description, as the values each representing the position of the layer of the image, the values "i=1 to N" of the Z number are registered in the control table 504a, but not limited to the above. As a value representing the position of the layer of the image, the position of the layer in the optical axis direction, that is, a focal length may be registered. For example, instead of the values "i=1" to "i=5" of the Z numbers as shown in FIG. 5, "500 µm", "502 µm", "504 µm", "506 µm", and "508 µm" may be registered as the positions of the layers of images in the optical axis direction. In this case, in (2) the operation of annotation mark display, the image processing unit 505 calculates the focal length of an image to be displayed next based on parameter information included in the focus change order input through the input unit 107. The image processing unit 505 obtains image data of a layer specified by the calculated focal length from the image storing unit 502. Then, the image processing unit 505 examines if annotation position information is registered or not in relation with the calculated focal length in the control table 504a. In a case where annotation position information is registered, the image processing unit 505 compounds the image data obtained from the image storing unit 502 with an annotation mark, which is obtained by visually reflecting the annotation position information, and expands the compound display information in the display buffer. Accordingly, an image including an annotation mark of a layer corresponding to the calculated focal length is displayed on the display screen (Step S104).

In the above, the mode is described in which the image data that forms the image pyramid structure 50 is stored in the storage unit 108 of the PC 100. However, instead of the PC 100, another computer or a server may store the image data that forms the image pyramid structure 50, and the PC 100 used by the user as a terminal apparatus may access the computer or the server to receive the image data. In this case, the PC 100 as the terminal apparatus and the server or the like may be connected via a network such as a LAN and a WAN. In particular, the use of the WAN can realize telepathology, telediagnosis, or the like.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A method of displaying an image, the method comprising:
    causing a display device to
    display a first annotation mark on a first microscopic image associated with an observation target object,
    wherein the first annotation mark is based on a second position information of a second annotation mark on a second microscopic image associated with the observation target object,
    wherein the first microscopic image and the second microscopic image include images of a same tissue or a same cell, and the first microscopic image includes an image of a different object from the second microscopic image, and
    wherein the first annotation mark is the same as the second annotation mark.

2. The method of claim 1, wherein the first microscopic image and the second microscopic image are images of at least one of a cell, a tissue, or an organ of a living body.

3. The method of claim 1, wherein the first microscopic image and the second microscopic image are images registered as related images.

4. The method of claim 1, wherein the first microscopic image and the second microscopic image are images corresponding to at least one of different focusing positions, different layers, different imaging times, or different aspects of the object.

5. The method of claim 1, wherein the first microscopic image and the second microscopic image have a first resolution.

6. The method of claim 1, wherein the first annotation mark is an image visually indicating a first position information of the first microscopic image.

7. The method of claim 1, wherein the first annotation mark includes a predetermined shaped frame.

8. The method of claim 1, wherein the first annotation mark is an image visually indicating a relationship between the first microscopic image and the second microscopic image.

9. The method of claim 1, further comprising:
    causing the display device to adjust and display the first annotation mark on an approximate center portion of an image displayed on a display area of the display device.

10. The method of claim 1, further comprising:
    causing the display device to display the second annotation mark with the second microscopic image.

11. The method of claim 10, further comprising:
    causing the display device to display the first annotation mark with the first microscopic image in response to switching from the second microscopic image to the first microscopic image.

12. The method of claim 1, further comprising:
    causing the display device to display the first annotation mark on the first microscopic image based on an operation to the second microscopic image.

13. The method of claim 1, further comprising:
    causing the display device to move to a first position of the first annotation mark based on an operation to the second annotation mark on the second microscopic image.

14. The method of claim 1, further comprising:
    causing the display device to
    display the first annotation mark on the first microscopic image in a case that is a first display mode; and
    not to display the first annotation mark in a case that is a second display mode which is different from the first display mode.

15. A method of displaying an image, the method comprising:
    causing a display device to
    display a first annotation mark on a first image associated with an observation target object,
    wherein the first annotation mark is based on a second position information of a second annotation mark on a second image associated with the observation target object,
    wherein the first image and the second image include images of a same observation target object, and the first image includes an image of a different object from the second image, and wherein the first annotation mark is the same as the second annotation mark.

16. The method of claim 15, wherein the first image and the second image are images of medical images, pathological images, biological images or material images.

17. The method of claim 15, wherein the first image and the second image are images corresponding to different focusing positions, different layers, different imaging time, or different aspect of the object.

18. An image processing system comprising:
  an imaging device configured to capture an image and generate a first microscopic image representing the image; and
  a memory storing executable user code which, when read, causes processing circuitry to:
  cause a display device to display a first annotation mark on the first image associated with an observation target object,
  wherein the first annotation mark is based on a second position information of a second annotation mark on a second image associated with the observation target object,
  wherein the first image and the second image include images of a same observation target object, and the first image includes an image of a different object from the second image, and
  wherein the first annotation mark is the same as the second annotation mark.

19. The system of claim 18, wherein the first image and the second image are images of medical images, pathological images, biological images or material images.

20. The system of claim 19, wherein the first image and the second image are images corresponding to different focusing positions, different layers, different imaging time, or different aspect of the object.

* * * * *